US012766770B2

(12) United States Patent
Lopes

(10) Patent No.: US 12,766,770 B2
(45) Date of Patent: Oct. 20, 2026

(54) MECHANICAL EJECTOR

(71) Applicant: Merkle Portugal, Unipessoal, LDA, Marinha Grande (PT)

(72) Inventor: Ricardo Miguel Elias Gomes Lopes, Barcelona (ES)

(73) Assignee: MERKLE PORTUGAL, UNIPESSOAL, LDA, Marinha Grande (PT)

( * ) Notice: Subject to any disclaimer, the term of this patent is extended or adjusted under 35 U.S.C. 154(b) by 36 days.

(21) Appl. No.: 18/852,608

(22) PCT Filed: Mar. 28, 2023

(86) PCT No.: PCT/EP2023/058021
§ 371 (c)(1),
(2) Date: Sep. 30, 2024

(87) PCT Pub. No.: WO2023/186908
PCT Pub. Date: Oct. 5, 2023

(65) Prior Publication Data
US 2025/0214290 A1 Jul. 3, 2025

(30) Foreign Application Priority Data
Apr. 1, 2022 (DE) ........................ 102022107788.8

(51) Int. Cl.
*B29C 45/44* (2006.01)

(52) U.S. Cl.
CPC ................................ *B29C 45/4435* (2013.01)

(58) Field of Classification Search
CPC . B29C 45/332; B29C 45/4005; B29C 33/442; B29C 2045/4414; B29C 45/4407;
(Continued)

(56) References Cited

U.S. PATENT DOCUMENTS 5,281,127 A * 1/1994 Ramsey .............. B29C 45/4435
425/557
10,549,459 B2 * 2/2020 Belliard ................ B29C 33/442
(Continued)

FOREIGN PATENT DOCUMENTS

CN 205291477 U * 6/2016 ........... B29C 45/332
EP 3210735 8/2017
(Continued)

*Primary Examiner* — Emmanuel S Luk
(74) *Attorney, Agent, or Firm* — Blueshift IP, LLC; Robert Plotkin

(57) ABSTRACT

The invention relates to a device, in particular an inclined ejector (1), for demolding a cast component (2) with an undercut from a casting mold for a casting process or an injection molding process with an ejector, comprising:

an ejector head (16) with a profile which is complementary to the cast component (2) with the undercut and is mounted in a recess (8) so as to be displaceable between a casting position and an ejection position, an ejector base (5) that moves in the translational direction;

a link chain (12), which mechanically connects the ejector head (16) with the ejector base (5) in order to implement a force and movement deflection, wherein the link chain (12) has a plurality of chain segments (121) which engage in one another in the longitudinal direction, have low play/backlash with respect to pull and push in the longitudinal direction and permit tilting relative to one another in at least a first transverse direction.

7 Claims, 5 Drawing Sheets

(58) Field of Classification Search
CPC ...... B29C 2045/445; B29C 2045/4442; B29C 45/4435
See application file for complete search history.

(56) References Cited

U.S. PATENT DOCUMENTS

| | | | | |
|---|---|---|---|---|
| 11,400,659 | B2 * | 8/2022 | Sutter | B29C 45/14409 |
| 2015/0375427 | A1 * | 12/2015 | Hoong | B29C 37/001 425/117 |
| 2017/0246770 | A1 * | 8/2017 | Belliard | B29C 45/4005 |
| 2017/0246771 | A1 * | 8/2017 | Belliard | B29C 45/401 |
| 2018/0257280 | A1 * | 9/2018 | Navarra Pruna | B29C 45/4005 |
| 2021/0107184 | A1 * | 4/2021 | Starkey | B29C 45/332 |
| 2023/0321876 | A1 * | 10/2023 | Belliard | B29C 45/4005 425/556 |

FOREIGN PATENT DOCUMENTS

| | | |
|---|---|---|
| EP | 3210746 | 8/2017 |
| FR | 3065388 | 10/2018 |
| JP | S59169829 | 9/1984 |
| JP | H04251724 | 9/1992 |
| WO | 2014126534 | 8/2014 |
| WO | 2020224142 | 11/2020 |

* cited by examiner

MECHANICAL EJECTOR

TECHNICAL FIELD

The present invention relates to a device for demolding undercuts within tools for plastic injection molding or within tools for die casting.

BACKGROUND OF THE INVENTION

When injection molding any type of injection-molded or die-cast parts, it is necessary to eject the molded or injection-molded part from the tool, for which cylindrical ejector rods are generally used in the main demolding direction. The demolding of a cast or injection-molded part by stroke or relative movement of the ejector rod(s) or the entire ejector device in relation to the tool plate(s) represents the state of the art.

If plastic injection molded parts or die-cast parts cannot be demolded in the main demolding direction, this is referred to as a negative(s) or undercut. This is remedied by ejector mechanisms in the tool that release the plastic injection molded part or die-cast part from the mold. In the case of injection molds or die-casting molds which, due to the structure of the part to be demolded, have certain areas with the aforementioned undercuts, it is not possible to demold the cast or injected part by means of relative movement of ejector rods or the ejector plate in relation to a tool plate. It is therefore state of the art to use so-called inclined sliders for processing of demolding undercuts.

Such ejector devices installed inside the injection molding tool or die-casting tool are activated at the moment of ejection by means of inclined rods. Such ejectors, called inclined sliders, are operated by a hydraulic cylinder. The latter are also referred to as ejector cylinders and generate a stroke by means of which the inclined slider moves along a sliding device, through the tool, in the demolding direction of the injection mold or die casting mold. The sliding device is often provided as a separate part within the ejector plates of the tool. An ejector device provided as an inclined slider means is usually designed with regard to the sliding mechanism in such a way that it diverts the stroke movement of the inclined slider in the demolding direction into a direction of movement that is at an angle to it. Consequently, the inclined slider means moves at an angle to the stroke direction of the ejector cylinder; this angle is largely determined by the shape and angular position of the sliding mechanism. Ejector mechanisms designed in this way therefore essentially consist of an inclined slider means that slides along a sliding mechanism. The sliding mechanism is designed with a defined friction structure and can be interchangeably mounted in the ejector plates. As described above, it often accommodates the inclined slider means in a housing. The angle set by the movement of the inclined slider means within the sliding mechanism corresponds more or less to the draft angle of the undercut to be demolded. The inclined slider means thus moves within the tool during the demolding process, whereby the desired demolding is achieved depending on the angle created.

A first disadvantage of an ejector device designed in this way is that the angle to be achieved must be produced individually for each geometry of the undercut to be molded, which generates a not inconsiderable amount of work when designing the ejector device. A further disadvantage is that the ejector device cannot be subsequently adapted in the relevant dimensions, for example in its length, for use in injection molds or die casting molds with a variable number of plates in the tool.

If a cast or injection-molded part has complex shapes with differently shaped undercuts or negatives of different sizes, the described demolding process becomes more complex, which makes the design of the tool and thus the ejector mechanism more expensive and thus represents a further disadvantage. As described above, the complexity can increase in application cases for designs with different demolding angles to be set up and thus also the space required for accommodating the aforementioned elements of an ejector device within the tool. In particular, if these elements have to be provided in small injection molds or die casting molds, e.g. for demolding undercuts or negatives with small sizes, there may be a lack of available installation space to accommodate all the aforementioned elements and thus to provide the different demolding angles required for efficient demolding.

An inclined ejector is known from EP 2 261 000 B1, the main feature of which is a combination of an ejector rod with an inclined ejector head attached to it, whereby the ejector rod and the inclined ejector head are guided in an exchangeable sliding bush within the tool. The ejector head is detachably connected to the ejector rod via a joint. This joint enables the ejector head to be inclined towards the longitudinal axis of the ejector rod in order to achieve a clearance angle that is required for demolding an undercut. A first disadvantage of this solution is that only a limited lateral offset can be achieved due to the limited vertical stroke of the inclined ejector and the limited cross-section of the opening of the inner wall of the sliding guide. A further disadvantage is that a sliding bush adapted to both the plates and the ejector rod with inclined ejector head must be provided in the tool, which represents an additional expense and requires a considerable amount of space. In addition, an inclined ejector designed in this way, as well as the solutions listed below according to EP 0498102 B1 or EP 3372377 B1, represent individual special solutions which cannot be subsequently changed or adjusted with regard to their effective length.

EP 0 498 102 B1 describes a dimensionally stable and simply constructed inclined slider of an ejector device which ejects undercuts in plastic injection molds. In its installation position in the mold, the inclined slider is designed at a predetermined angle within a square sliding gate in the manner of a sliding guide. This angle is achieved by attaching a first end of the inclined slider at a fixed angle to a coupling, which then slides along a holder attached to the mold ejection plates. The individually designed inclined slider is individually designed for an injection tool or die-casting tool and requires a sliding guide adapted to it, as well as at least one coupling element, in order to be able to replace the elements of the inclined slider if necessary. This usually requires the complete tool of the plastic injection mold to be dismantled. The size of the undercut to be demolded, the required horizontal displacement of the inclined slider and the required travel of the entire ejector device determine the angle at which the inclined slider operates. A first disadvantage is that the inclined slider to be designed in relation to the dimensions of the injection tool or die-casting tool requires a special design for each mold. A further disadvantage is that the square pusher must be elaborately inserted inside the ejector plates of the injection mold or die-casting mold. Each such ejector device therefore requires special adaptation of all its elements to the specific injection tool or die-casting tool. Such adaptations are usually expensive and time-consuming, which is a further disadvantage.

An ejector is known from EP 3 372 377 B1, the main feature of which is a slider consisting of a flexible pull and push element. The flexible element is represented by a coil spring that cannot be compressed within limits, with the coils of the coil spring ideally being in contact with each other at all times. A further feature of the ejector is represented by an internal wire which runs between the base end and the head end of the ejector, is clamped at these ends and gives the coil spring an initial preload in the assembled state. This is an ejector which, unlike the inclined slider known from EP 0 498 102 B1, is accommodated in holes within the ejector plates and therefore does not require a separate sliding element for guidance within the tool. A special feature of this solution is that this version of an ejector comprises a pull and push element with a predetermined initial length in the assembled state, which is ostensibly neither compressible nor extendible. A further special feature is therefore that this ejector device has a flexibility and elasticity that corresponds more to a mechanical spring than a mechanical spindle. The flexibility of the mechanical spring enables the central element of the ejector device to adapt to the geometry of the aforementioned holes in the ejector plates. The angular position of the coil spring thus flexibly follows the line defined by the holes.

However, the described advantage of this solution has a first disadvantage, which lies in the flexibility and therefore the elasticity of the coil spring used. This disadvantage manifests itself in a change in length caused by the elongation of the coil spring that occurs during operation. This elongation can only be limited to a small extent by the internal wire, to which the elongation of the wire also contributes. The resulting change in length leads to a progressive loss of tension bias in the coil spring, which, together with the push and pull load that occurs during operation, leads to premature fatigue of the pull and push element of the ejector device. In addition, the coil spring causes increased friction on the walls of the bores within the tool due to its uneven form factor. The abrasion caused by this friction, which cannot be removed, is a further disadvantage of this solution. Finally, the elongation of the coil spring and the abrasion that occurs cause increased wear of the entire ejector device, which is a further disadvantage of this solution.

None of the solutions known from the aforementioned state of the art has a modular concept that can be changed by means of simple solutions, which represents a suitable combination of similar elements with standard parts in order to produce adaptable designs corresponding to the respective application with little effort.

The invention is thus based on the task of further developing an inclined ejector described at the beginning for an ejector device of an injection mold or die-casting mold in such a way that, on the one hand, it has a high degree of dimensional stability and low clearance for absorbing large ejection forces while at the same time being flexible and, on the other hand, is constructed from replaceable, extendable and adjustable elements which are as similar as possible in order to eliminate the aforementioned disadvantages of the prior art.

DISCLOSURE OF THE INVENTION

This obuject has been achieved by a device for demolding a cast component with an undercut from a casting mold for a casting process or an injection molding process with an ejector according to claim 1.

Further embodiments are given in the dependent claims.

Accordingly, a device, in particular an inclined ejector, is proposed for demolding a cast component with an undercut from a casting mold for a casting process, in particular for an injection molding process or die casting process with an ejector, comprising:

- an ejector head with a profile which is complementary to the cast component with the undercut and is mounted in a recess so as to be displaceable between a casting position and an ejection position,
- an ejector base that moves in a translational direction;
- a link chain that mechanically couples the ejector head with the ejector base in order to realize a force and movement deflection, wherein the link chain has a plurality of chain segments which engage one another in a longitudinal direction, have low backlash with respect to pull and push in the longitudinal direction and permit tilting relative to one another in at least a first transverse direction.

A first advantage of the solution according to the invention is the adaptability of the inclined ejector by lengthening or shortening it in order to adapt the inclined ejector to the geometry of the tool, in particular to the functions and dimensions of the plates used therein. To this end, the link chain can advantageously be lengthened or shortened by adding or removing chain segments of the same type. In particular, the properties of flexurally rigid elements are combined with the advantages of a flexible chain solution in the inclined ejector according to the invention. In this context, flexurally slack means that the link chain is designed with low backlash with respect to pull and push in the longitudinal direction (i.e. an arrangement direction of the chain segments) and the chain segments of the link chain allow tilting with respect to one another in at least one transverse direction, preferably the first transverse direction, which runs perpendicular to the longitudinal direction). The link chain is designed to be inelastic beyond the material elasticity to be taken into account in the design and has no resilient properties, particularly in the longitudinal direction. As a result, the link chain has fatigue-resistant properties, in contrast to inclined ejector solutions that are only designed to be operationally stable and contain springs or elastically designed link rods.

A further advantage of the solution according to the invention lies in the possibility of combining elements of different designs and/or dimensions in order to provide different embodiments of the inclined ejector according to the invention for different tools with different plate geometries, numbers of plates and/or plate functions. For example, the same base piece can be accommodated in a link chain with a larger or smaller diameter or a longer or shorter length, thanks to the standard design of the fastening means in accordance with the standardized screw connection (ISO thread). In a further embodiment, the link chain of the aforementioned embodiment can be combined with a transition piece of larger or smaller diameter and/or different length. Finally, in a further embodiment, the transition piece of the aforementioned embodiment can be combined with an ejector head of different shape and/or larger or smaller diameter and/or different length. In this way, different embodiments of the inclined ejector according to the invention can be provided from elements which are effectively the same but have different shapes and/or dimensions.

In particular, at least two of the engaging (interlocking) chain segments can be joined by inserting a chain segment head of one of the chain segments into a chain segment head receptacle of another chain segment in a second transverse direction, in particular perpendicular to the first transverse direction and perpendicular to the longitudinal direction.

According to this first, advantageous aspect, the flexurally slack element of the inclined ejector can be designed as a link chain consisting of similar chain segments and of a base piece and head piece, the elements of the link chain being pushed laterally into one another for their assembly at joining points. As a result, the link chain has a structurally designed flexural slackness, particularly in a first transverse direction, whereas in a second transverse direction perpendicular to the first direction, the flexural slackness is limited beyond the elasticity of the material used in the elements. The elements of the link chain can preferably be made of metallic material, although temperature-resistant plastics or ceramics can also be used as alternative materials.

In a preferred embodiment, the chain segment can have differently shaped areas. A first area is represented by a chain segment head, a second area by a chain segment neck, a third area by a chain segment shoulder, a fourth area by a chain segment body and a fifth area by a chain segment base.

It may be provided that at least one of the chain segments has one or two chain segment heads projecting opposite one another in the longitudinal direction, which engage with low backlash in a correspondingly complementary chain segment head receptacle of another of the chain segments, so that tilting of the chain segments in only the first transverse direction is made possible.

Furthermore, at least one of the engaging chain segments can have at least one chain segment head projecting in the longitudinal direction, which is cylindrical in shape and has an at least partially segment-like, circular-cylindrical lateral surface, wherein a tapered chain segment neck is provided with respect to the longitudinal direction, so that two engaging (interlocking) chain segments are each held together by the engagement of one of the chain segment heads in the corresponding chain segment head receptacle and can be pivoted with respect to the first transverse direction.

In particular, the chain segments can have a circular cylindrical base body with respect to the longitudinal direction and an axial through-opening in the longitudinal direction, whereby a bendable fixing element is guided through the through-openings of the chain segments in order to hold the chain segment head of one of the chain segments in the corresponding chain segment head receptacle of the other chain segment.

The axial through-opening which can preferably be produced by means of erosion or by means of a through-hole, can thus be located within the chain segment head of the preferred embodiment. The bendable fixing element, which can be designed as a wire or flexible rod and fixes the assembled chain segments in the correct position within the link chain in the manner of a core, can be accommodated within this through-opening.

In particular, the chain segment neck can be accommodated in a chain segment neck receptacle with backlash in the first transverse direction in order to allow the chain segments to tilt by a predetermined angle.

Within the chain segment body of the preferred embodiment, there may be a recess which can preferably also be produced by means of erosion and is referred to as the chain segment head receptacle. This chain segment head receptacle accommodates a chain segment head, which is pivotably arranged therein. The shape of the chain segment head and the chain segment head receptacle have corresponding contours, whereby the contours of the chain segment head and the chain segment head receptacle can represent circular segment cylindrical bodies of different radii. Both the chain segment head and the chain segment head receptacle can be designed with a clearance fit H7/g6, which has a maximum bearing tolerance of up to 0.02 mm. This results in a minimum clearance between the chain segment head and the chain segment head mount.

Furthermore, at least one of the chain segment heads can be arranged between two chain segment shoulders extending in the first transverse direction and/or facing one another, wherein a chain segment head receptacle, in which the at least one chain segment head is received, is arranged between two chain segment bases extending in the first transverse direction and/or facing one another, wherein the chain segment shoulders and chain segment bases face one another and enclose an angle within which tilting of the chain segments by a predetermined angle is possible.

The chain segment neck of the preferred embodiment is located in the transition area between the chain segment head and the chain segment shoulder and has an undercut. This undercut is characterized by a radius and represents the base of a joint. This joint is formed by the positive and frictional sliding play/backlash of the chain segment head in the chain segment receptacle above the chain segment neck, as well as by the mutual contact between the chain segment shoulder and the chain segment base.

In a preferred embodiment, the contour of the chain segment base and the chain segment shoulder can be designed as a straight bevel. In this preferred embodiment, the bevel of the chain segment base and the chain segment shoulder can form an angle to each other when the chain segments are assembled. This angle can be between 1° and 5°, preferably 3°. By means of closely dimensioned, complementary contact surfaces, on the one hand between the chain segment head and the receptacle of the chain segment head and on the other hand between the chain segment shoulder and the chain segment base, limited, defined angles can be created between the chain segments. In the preferred embodiment of the chain segments, the tilting between the chain segments only takes place in one plane, whereas there is no tilting in the plane perpendicular to it. This produces a flexible link chain which can perform an inclined translatory movement in the free spaces between the plates within the tool, without any guide, to move the ejector head between a casting position and an ejection position.

In a further conceivable embodiment of the chain segment, a "male" designed chain segment body is conceivable, whereby this chain segment body has a chain segment head and a chain segment neck as well as a chain segment shoulder at both of its ends. Complementary to this further conceivable embodiment of the chain segment, a "female" designed chain segment body is conceivable, whereby this chain segment body has a chain segment head receptacle and a chain segment base at both of its ends. The "male" and the "female" chain segment body can be inserted into each other in alternating sequence in order to obtain a further embodiment of the link chain. Within the "male" and the "female" chain segment body of this further conceivable embodiment, there can be a through-opening, which can preferably be produced by means of erosion or by means of a through-hole. A fixing element can be accommodated within this through-opening, which can be designed as a wire or flexible rod and fixes the assembled chain segments together in the correct position within the link chain in the manner of a core.

In a further conceivable embodiment, the contours of the chain segment base and the chain segment shoulder can be rounded. In this further embodiment, the rounding of the chain segment base and the chain segment shoulder can preferably have a mutually complementary shaped radius or mutual rolling radius. In this further embodiment of the chain segments, the angulation between the chain segments can take place in at least one first plane and additionally in at least one second plane that is inclined relative to the first plane. This further embodiment of the chain segments can be used within tools in which, due to transverse forces acting on the link chain, it may be necessary for the link chain to deflect by a limited amount into at least a second plane in order, on the one hand, to produce increased flexibility within the link chain and, on the other hand, to prevent the link chain from breaking.

In the preferred embodiment, as described above, the chain segments that can be interconnected by joining can be designed as a close-fitting joint in the manner of a hinge by means of a low-backlash fit H/7g6, whereby the resulting flexible link chain has a high strength and dimensional stability on the one hand and a flexibility that can be achieved in a defined direction on the other. By means of the chamfering or rounding of the chain segment base and the chain segment shoulder, a tilt angle β can be set after joining between the chain segments, at which a first chain segment body can be tilted in relation to another chain segment body. The greater this tilt angle β is in relation to the diameter D of the link chain, the greater the bending lines the link chain can pass through free-standing or in the bushing or guide, characterized by an inclination angle α. An achievable horizontal ejection offset S is proportional to the inclination angle α and runs transverse to the reference axis A. The inclination angle α results from the geometric addition of the tilt angle β that occurs between the chain segments. Consequently, the tilt angle β determines the movement of the inclined ejector relative to the reference axis A at the inclination angle α. This advantageously means that a predetermined lateral ejection offset S can be achieved by means of the vertical ejection stroke L depending on the course of the movement of the inclined ejector, characterized by the inclination angle α of the link chain. The direction of movement of the inclined ejector thus results geometrically from the superimposition of the vertical ejection stroke L with the lateral ejection offset S. The greater the vertical ejection stroke L and the lateral ejection offset S, the larger the undercuts that can be demolded. Depending on the design of the undercut and the number of plates used in the mold, the superposition of the vertical ejection stroke L and the lateral ejection offset S required to achieve an optimum demolding and ejection result can be achieved. A further advantage is that the effective length of the inclined ejector can be changed by inserting additional chain segments into the link chain while the ejection stroke L remains the same, depending on the number of plates used in the tool. When changing the tool, for example by changing either the number of plates in the tool or their respective thickness, especially when changing the cavity plate, an appropriately configured inclined ejector can enable different ejection angles for differently shaped undercuts by means of variation. The size of the vertical ejection stroke L and the adjustable lateral ejection offset S is therefore decisive for successful demolding and the subsequent ejection of the undercut.

The base part of the link chain can have an internal threaded section at a first end and a head at a second end, the contour of which corresponds to the chain segment head found in the link chain. The head part of the link chain can have an internal threaded section at a first end and a receptacle at a second end, the contour of which corresponds to the receptacle for the chain segment head found in the link chain.

For this purpose, it can be provided that the fixing element is additionally mounted in the through opening in a sliding manner in order to secure a base part of the link chain and the chain segments and a head part of the link chain against mutual shearing in the second transverse direction.

In continuous operation, despite a close fit, unavoidable bushing or hinge wear occurs between the chain segments, which can reduce the dimensional stability of the link chain and cause abrasion between the chain segments, which can lead to a minimal change in the length of the link chain. Due to dynamic elongation or compression of the link chain, the aforementioned effects can intensify, resulting in a situation in which the ejector head of the inclined ejector either protrudes from the head-side demolding area of the cavity plate during the injection molding or die-casting process or is in a position below the head-side demolding area, in other words no longer flush with the upper edge of the cavity plate. This can lead to an irreparable error in the forming and/or demolding of the undercut, up to the partial destruction of the cavity plate or the forming area of the injection plate within the mold. As a result, the number of defective undercuts and therefore defective plastic injection molded parts or die-cast parts can increase significantly due to this incorrect position of the ejector head. This situation can be prevented by means of the initially and during continuous operation of the tool adjustable and readjustable bias tension of the link chain by means of an adjustable base piece with fastening part.

Due to the high mechanical stress during the injection molding or die casting process, the link chain of the inclined ejector is either compressed or elongated in alternating cycles, whereby the dynamic compression or elongation of the link chain takes place in the micrometer range. The biasing of the link chain is achieved by means of the adjustable base piece with a fastening part by screwing the adjustable base piece with the fastening part into a thread within the base part of the link chain during its assembly and tightening it by means of an initial torque. This screw connection can be retightened during continuous operation by means of a retightening torque. The biasing generates a pre-stretching of the link chain, which leads to an initial elongation of the link chain by 0.1 millimeters.

In all embodiments, the at least first and at least second chain segment can each have a recess, wherein the recess extends in the axial longitudinal direction of the chain segment and represents an internal bore arranged concentrically to the outer diameter of the chain segment. The chain segment or the chain segments and the recess therein can preferably be produced by wire erosion, in particular by electrical discharge machining or spark erosion, in order to produce uniform, precise, and delicate contours on and within the chain segments. The recess can accommodate a fixing element, which can be designed as a wire or flexible rod and serves to fix the chain segments in the correct position in relation to one another and to prevent the chain segments from migrating or shifting relative to one another. The first advantage of this is that the chain segments are secured in their position and are not lost during the assembly or disassembly process of the inclined ejector within the plates of the tool.

According to a further advantageous aspect, the link chain head and the transition piece of the inclined ejector can be slidingly mounted on an inner wall of a bushing and/or a guide, whereby the bushing and/or guide can in particular have a round cross-section. The feed-through is preferably designed as a bore and can have several sections with different diameters and, depending on its dimensions and geometric arrangement in the plates of the tool, can have different contours in certain areas. As a result, straight and/or curved sections of the feedthrough can be realized, in particular depending on the design of the transitions between the individual plates of the tool. In particular, a first curved section of a feed-through can be formed in the lower area of the feed-through, directly above the base area of the inclined ejector, which is followed by a first straight section in the further course of the feed-through. It is conceivable that the first straight section is followed by a second curved section, which in turn merges into a second straight section. In this way, an inclined ejector that can be adapted to the respective sections of the feed-throughs in the plates and to the special features of the ejector head or the cavity plate can be used advantageously. The feed-through is preferably located in the cavity plate and/or other plates within the injection mold or die-casting mold, with the walls of the feedthrough and the guide in particular forming a cylindrical contact surface for holding the link chain as well as for holding the transition piece. In a first embodiment, the cross-section of the bushing can widen in sections, starting in the area of the link chain receptacle at a first end of the cavity plate, transitioning into a first widening in the area of the guide of the transition piece and ending in a second widening in the area of the recess at a second end of the cavity plate, which serves to hold the ejector head. The angular position of the replaceable guide relative to the vertical axis of the tool ensures that the inclined ejector in the area of the transition piece always returns to the same, inclined position within the recess within the cavity plate and thus the limited clearance angle produced by the inclined ejector for forming the undercut is always guaranteed. The guide is preferably detachably fixed in the first opening of the bushing by means of a press fit and can be replaced due to wear. The guide is mounted in the first widening of the bushing and can be designed as a round tube, whereby the round tube can consist of a metallic or ceramic material.

According to a further aspect, the ejector head can be designed in the form of a conical body and can be accommodated in a conical recess in the head-side forming area of the cavity plate. Due to the conical design of the ejector head and the wall of the recess within the cavity plate, reduced resistance is achieved when forming an undercut. Another advantage of this design is that it effectively prevents the ejector head from being forced into the cavity plate's forming area. In a further, advantageous embodiment, the ejector head can be a two-membered body, whereby a first member of the ejector head can be a cylindrical base body of smaller diameter, which is non-detachably connected to a second member of larger diameter, in particular by means of a shrink fit, preferably in a concentric arrangement. The second member can in particular be a conical or cylindrical body, the contour of which corresponds to the wall of the recess in the cavity plate for receiving the ejector head.

In a further embodiment, the ejector head can be a cylindrical body that has the same diameter as the transition piece, as well as the link chain head, the link chain, and the base piece. Such an embodiment can be used, for example, in the aforementioned injection tools or die-casting tools which produce plastic injection molded parts or die-cast parts without undercuts and have exclusively a vertical main demolding direction. In a further development of this embodiment, the ejector head can be omitted and instead the transition piece can be designed as an ejector head in the form of an extendable or shortenable ejector rod.

Furthermore, in addition to the embodiments of the inclined ejector according to the invention described above, embodiments are conceivable in which, in addition to the guide in the cavity plate, sliding sleeves are embedded in the feed-through in the plates of the tool. Such sliding sleeves can be used in the plates of injection tools or die-casting tools in which the elasticity of the plates causes deformation of the walls of the feedthrough during continuous operation. An undesirable effect could be greater friction or distortion of the link chain within the bushing, which can lead to a link chain break. Similar to the guide, such sliding sleeves can be made of a metallic material, in particular a bronze or bronze-graphite alloy or ceramic material, and preferably have a flexibility corresponding to the link chain and a coefficient of friction adapted to the sliding pairing between the sliding sleeve and the link chain. In particular, the sliding sleeve made of metallic material, especially a bronze or bronze-graphite alloy or ceramic material, can be designed as a cylindrical tubular body.

BRIEF DESCRIPTION OF THE DRAWINGS

Details of the invention are explained in more detail with reference to an embodiment example shown in the attached figures. Identical multiple references to a component in one and the same figurative representation include both the singular and the plural of the element shown in each case. They show:

FIG. 2*b* top view of a longitudinal section of the link chain detached from the assembly of the inclined ejector and the transition piece, in a straight line relative to each other;

DESCRIPTION OF EMBODIMENTS

Figure 1A:
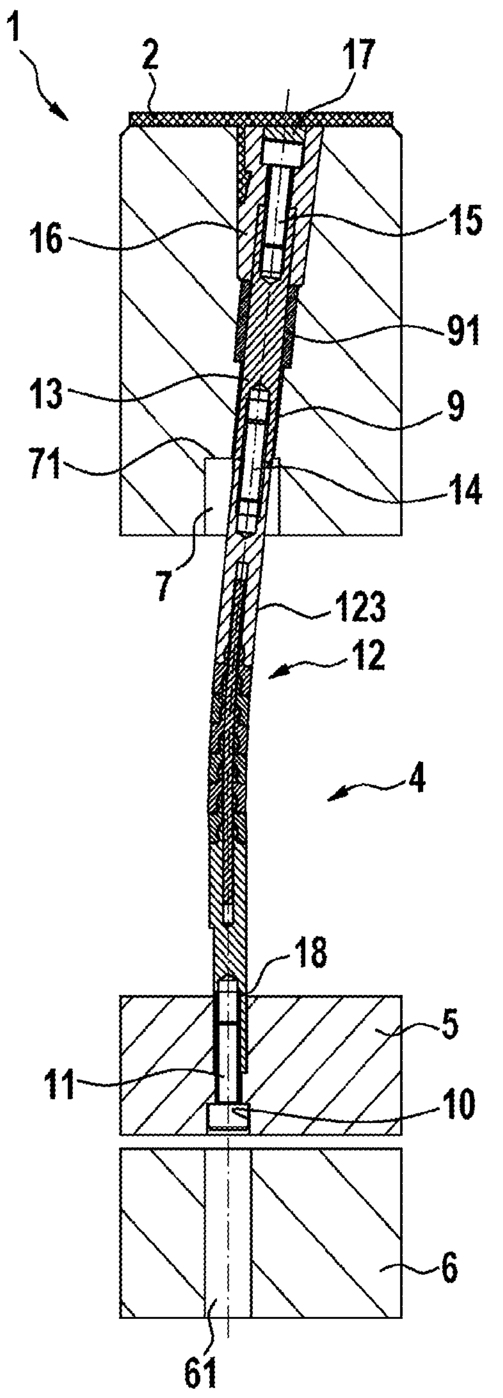
FIG. 1*a* a longitudinal section of an embodiment of the inclined ejector and an undercut of an injection molded part or die-cast part, showing the situation at the end of the molding process and immediately before demolding of the undercut.

FIG. 1*a* shows the inclined ejector 1 in a plastic injection mold or die-casting mold in a first position (casting position), illustrating the situation immediately after the molding process of a molded component 2 (plastic injection molded part or die-cast part) and before the molded component 2 is formed with an undercut.

The casting mold is formed by a recess 8 in a casting body. A conical ejector head 16 lies in a first position within the conical recess 8 in the molding area of the cavity plate 3 immediately before the ejection process and is positively connected to the undercut.

Inside an ejector plate 5, which represents an ejector base or a part thereof, there is a base piece. The base piece has a fastening part 11, which is located in a first position above the base plate 6.

Figure 1B:
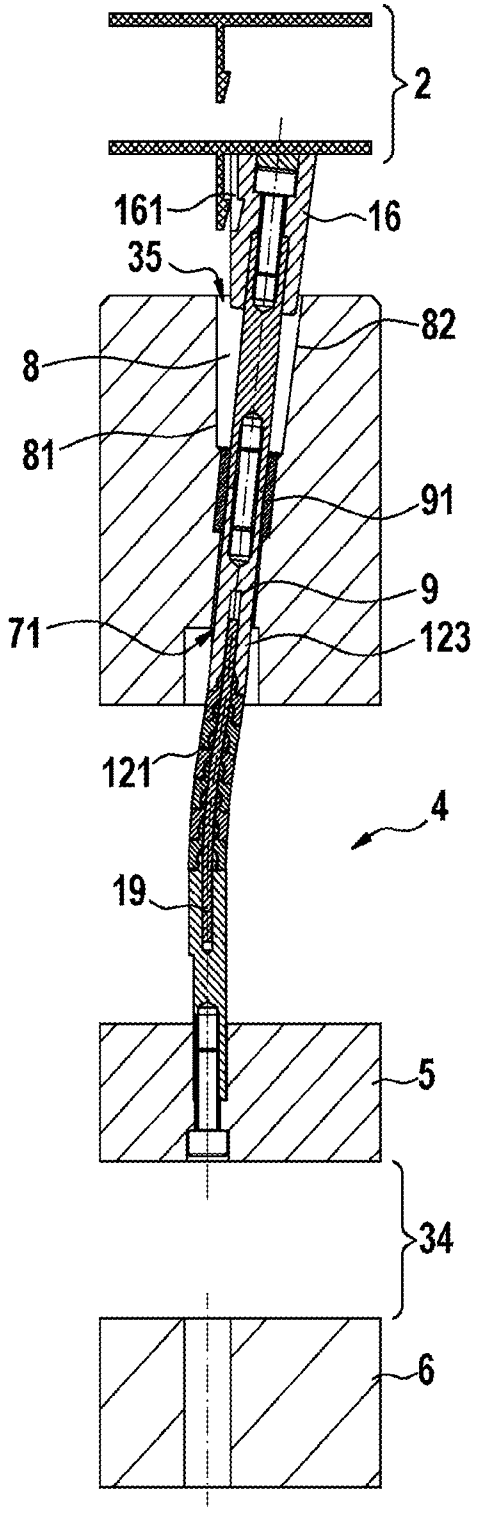
FIG. 1*b* a longitudinal section of an embodiment of the inclined ejector and a molded undercut of an injection molded part or die-cast part, showing the situation immediately after ejection and separation of the undercut from the cavity plate, as well as the undercut completely detached from the ejector head after demolding.

FIG. 1*b* shows the inclined ejector 1 in a plastic injection mold or die-casting mold in a second position (ejection position) during the ejection process. The ejector plate 5 is moved into the second position, for example, by a piston of a hydraulic ejector cylinder (not shown) by means of a vertical ejection stroke L (34). In this step of the demolding process, the ejector head 16 is still positively connected to the undercut and thus to the plastic injection-molded part or die-cast part. During the demolding process, the cone-shaped ejector head 16 moves into the second position, in which it detaches from the first wall 81 of the cone-shaped recess 8 in the head-side demolding area of the cavity plate 3, while it slides along the second wall 82 of the cone-shaped recess 8 in the head-side demolding area of the cavity plate 3 in the main demolding direction.

A link chain 12 is provided, which is composed of interconnected chain segments 121. Due to the mechanically positionally stable and low-backlash connection of the chain segments 121 to one another, the link chain 12 can be advanced into the second position within an intermediate space 4, a bushing 7, a bushing 9, and a guide 91. To support the threading of link chain 12 into bushing 9, a chamfer 71 can be provided in the transition area between bushing 7 and bushing 9. Due to the dimensionally stable and flexible properties of the link chain 12, it can be moved, i.e. advanced, in the intermediate space 4 without being guided or supported. A through-hole 61 within the base plate 6, which is preferably designed as a hole, provides access to the base piece with fastening part 11. A screwdriver or a hexagon wrench or a multi-tooth wrench can be inserted into the through-hole 61 (not shown), by means of which the tightening torque of the base piece with fastening part 11 can be subsequently adjusted in order to readjust the bias/pretension of the link chain 12.

FIG. 1*b* shows the inclined ejector 1 in the upper area, i.e. above the inclined ejector 1 in a plastic injection mold or die-casting mold, remaining in its second position during the ejection process. The notch 161 of the ejector head 16 releases the cast component 2. From this step of the ejection process, the ejector head 16 is no longer positively connected to the undercut of the molded component 2. The injection molding plate (not shown) or die casting plate (not shown) takes the plastic injection molded part, represented by its undercut, with it and guides it away from the ejector head 16. The undercut of the molded component 2 is completely ejected in this step.

Figure 2A:
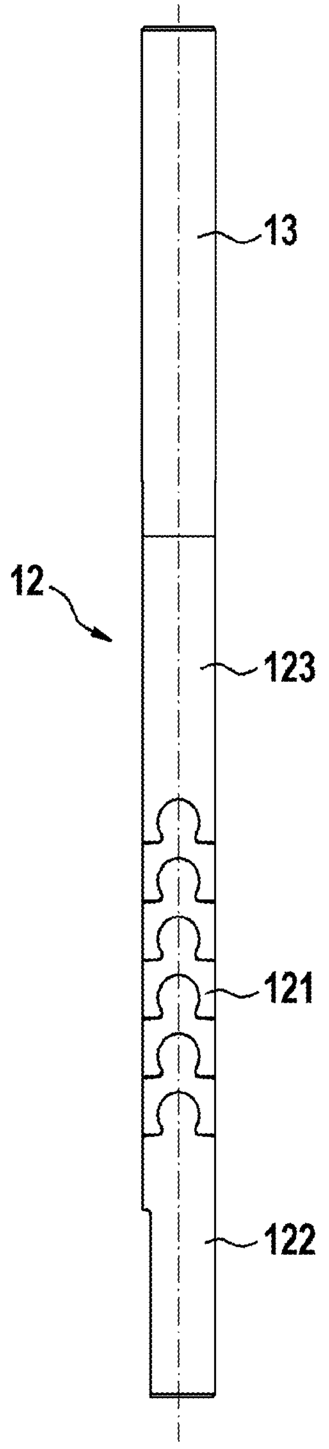
FIG. 2*a* a side view of the link chain detached from the assembly of the inclined ejector and the transition piece, in a straight position in relation to each other.

FIG. 2*a* shows a side view and a partial longitudinal section of the link chain 12 and the transition piece 13. These are positioned in a straight line relative to each other. In the straight-line position, the chain segments 121 are not tilted towards each other and the contact areas of the chain segment bases 27 rest against complementary contact areas of the chain segment shoulders 28 of the respective chain segment 121. In this straight position, maximum vertical lifting forces can be generated by means of the inclined ejector 1, which represents an advantage in the design of the inclined ejector 1, in particular as a straight ejector rod.

Figure 2B:
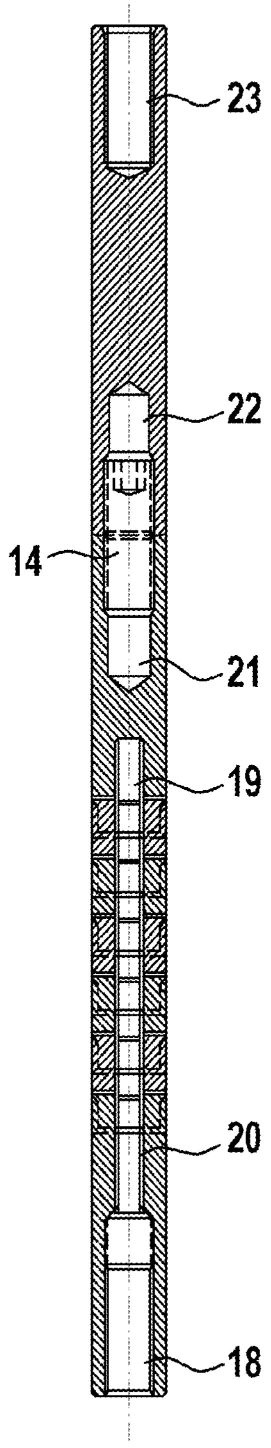

FIG. 2*b* shows a top view of a longitudinal section through the link chain 12 and the transition piece 13. A threaded section 18 can be provided in the base 122 of the link chain 12, which merges in the longitudinal direction into a bore 19 (through channel through the chain segments 121). A base piece with a fastening part 11 in the form of a standard screw can be screwed into the threaded section 18 (not shown). By means of the base piece with fastening part 11, the link chain 12 can be detachably connected to the ejector plate 5 of the tool, and the pretension of the link chain 12 can be adjusted by means of the screw-in depth and the tightening torque of the base piece with fastening part 11 in the threaded section 18.

As shown in FIG. 2*b*, threaded sections 21, 22, 23 can be provided, which can be used to accommodate fasteners. In this case, the threaded sections 21 and 22 accommodate a first fastener 14 in the form of a threaded pin (standard part), by means of which the link chain 12 is detachably connected to the transition piece 13. Threaded section 23 accommodates a second fastening means 15 in the form of a standard screw (not shown), by means of which the transition piece 13 is detachably connected to the ejector head 16. A fixing element 20 can be accommodated within the bore 19. The fixing element 20 can, for example, be in the form of a wire, a wire rope, or another flexible element.

The bore 19 extends centrally in the longitudinal axis 32 of the link chain 12 and can preferably be provided during the manufacture of the chain segments 121 and the base and head parts 122, 123 of the link chain 12. On the one hand, the fixing element 20 located in the bore 19 provides a positional locking for the chain segments 121 and for the base and head parts 122, 123 (start and end piece) of the link chain 12 during the assembly process or the disassembly process of the inclined ejector 1 in the tool. On the other hand, the fixing element 20 provides an internal return spring for link chain 12 in accordance with its elasticity, whereby link chain 12 can return to its original shape after deflection.

Figure 3A:
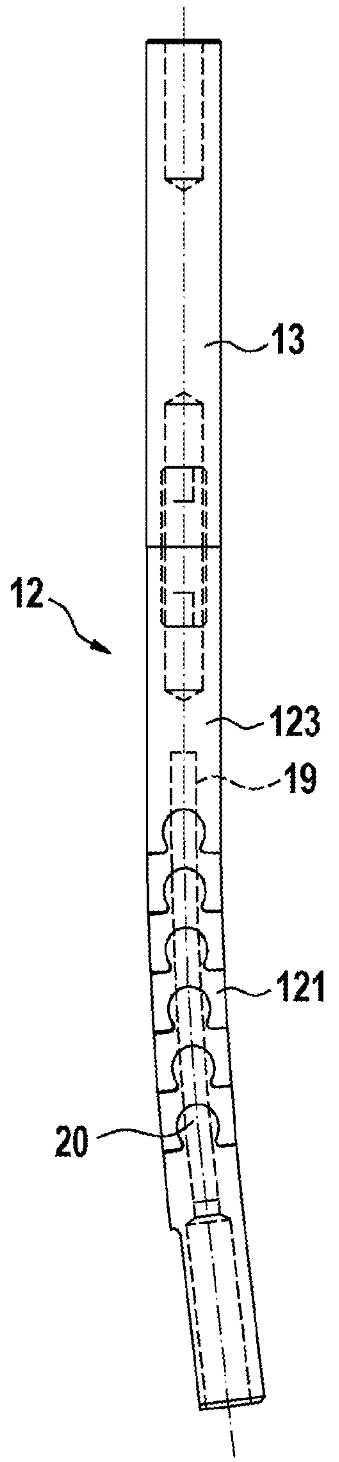
FIG. 3*a* a longitudinal section of the link chain detached from the assembly of the inclined ejector and the transition piece in an inclined position relative to each other.

FIG. 3*a* shows a side view of the transition piece 13 connected to the link chain 12 in an inclined position in relation to each other. The inclined position is created by bending the chain segments 121 towards and away from each other. The fixing element 20 located in the bore 19 (indicated) is forcibly bent by the bending of the chain segments 121 relative to each other and, as described above, represents a return spring for the link chain 12 in accordance with its elasticity. During assembly or disassembly of the inclined ejector 1, the fixing element 20 also ensures that the chain segments 121 do not shear off one another in a second transverse direction and/or are lost within the tool during assembly or disassembly of the inclined ejector 1.

Figure 3B:
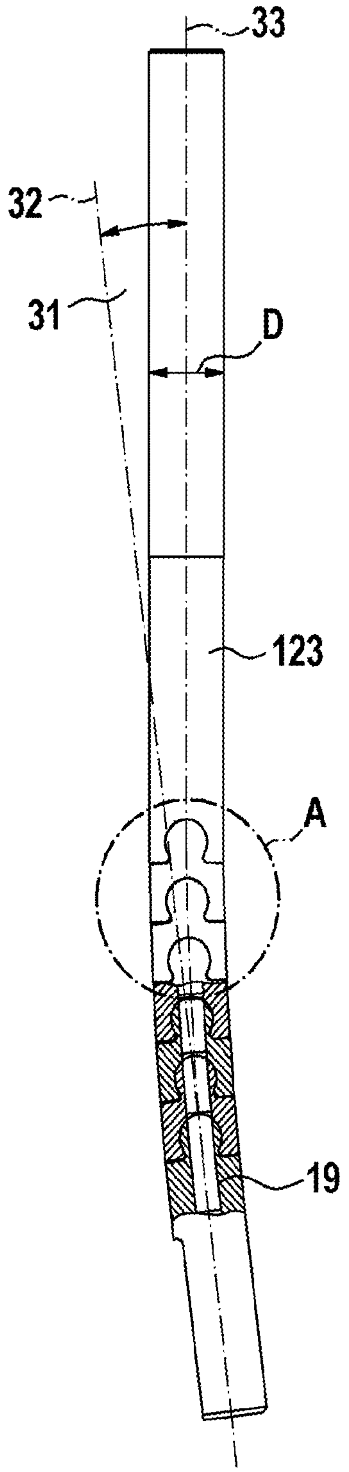
FIG. 3*b* a side view and a partial longitudinal section of the link chain detached from the assembly of the inclined ejector and the transition piece, in an inclined position relative to each other.

FIG. 3*b* shows the angle of inclination α (31) generated by bending the chain segments 121 in a side view and partially in a longitudinal section. The angle of inclination a (31) is set between the reference axis A (32) and the reference axis B (33) and can cover an angle range of 0 to 15 degrees, preferably an angle range of 5 to 10 degrees. Depending on the diameter D of both the link chain 12 and, in particular, the transition piece 13, a certain degree of slimness of the inclined ejector 1 results. The degree of slimness results from the ratio of its total length, resulting from the length of the link chain 12 and the length of the transition piece 13, to the diameter D. The slimmer the inclined ejector 1 can be designed, the closer several similar inclined ejectors 1 can be positioned next to each other in the injection mold or die-casting mold.

Figure 4:
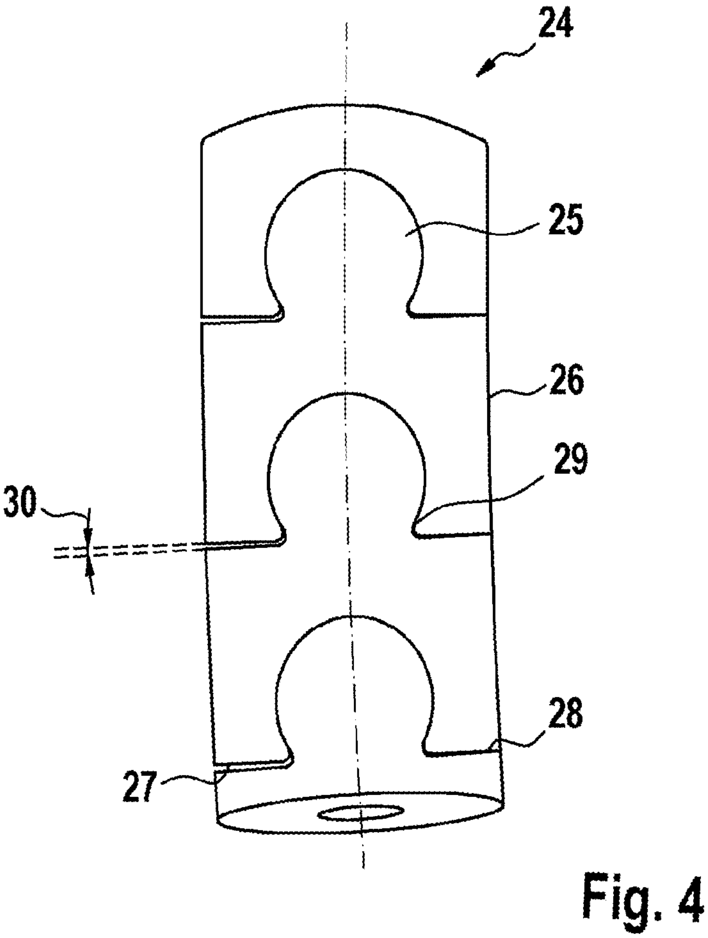
FIG. 4 a detail A of three chain segments (three-part link chain section) that are inclined to each other.

FIG. 4 shows a side view of detail A referenced in FIG. 3*b*. In this detailed view, several chain segments 121 of a preferred embodiment, which are connected to one another, are shown in an inclined position relative to one another. Due to the tilting of the chain segments 121 to each other above the chain segment neck 29, a tilting angle β (30) is formed after the chain segments 121 have been assembled by means of the bevel of the chain segment base 27 and the chain segment shoulder 28. Within the assembly of the link chain 12, there are several link chain sections 24, in each of which a chain segment head 25 is articulated in a chain segment head receptacle 26 in the manner of a low-backlash hinge. In addition to the greatest possible flexibility, this design ensures maximum contour accuracy of the link chain 12, which therefore has high dimensional stability and low elongation. The bushing play/backlash between the individual chain segments 121 is minimized in the design of the aforementioned low-backlash hinge, which reduces the wear of the link chain 12 and thus of the inclined ejector 1 as a whole.

Figure 5:
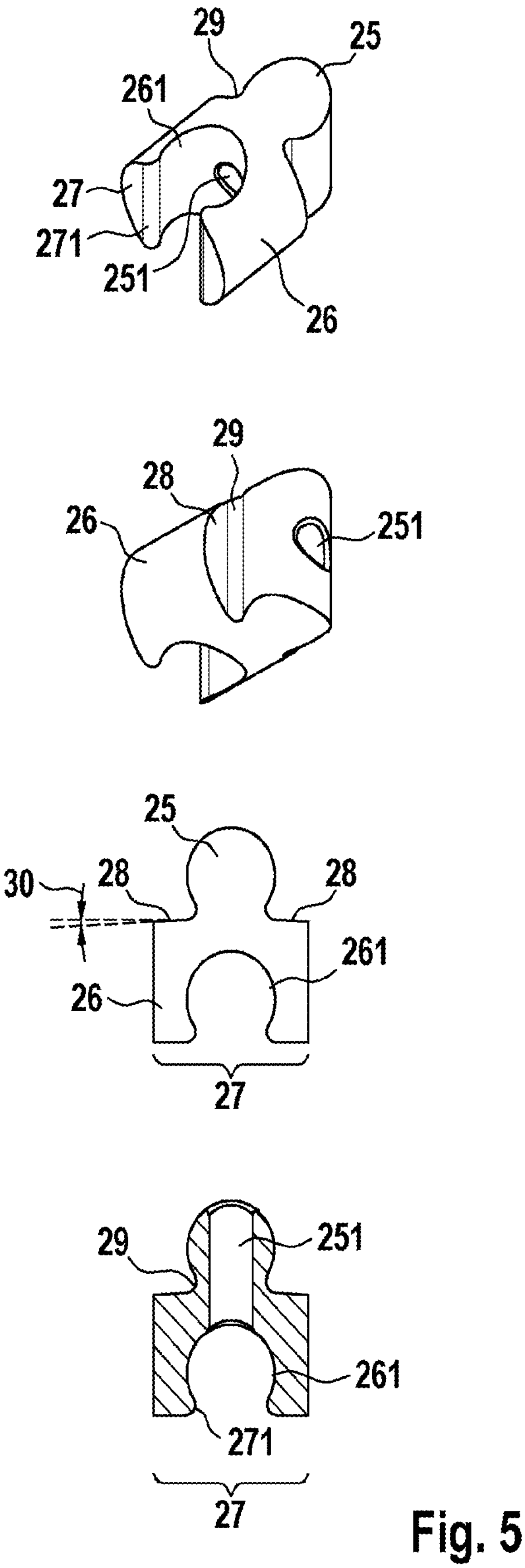
FIG. 5 different views of a single chain segment that has been detached from the link chain assembly.

FIG. 5 shows a single chain segment 121 of a preferred embodiment detached from the link chain 12 in various views. This embodiment is characterized by a circular-cylindrical chain segment body 29, a circular-cylindrical chain segment head 25 and a complementary circular-cylindrical chain segment receptacle 26 as well as by complementary chamfers of the chain segment shoulder 28 and the chain segment base 27. Due to these chamfers, a tilting angle β (30) of between 1° and 5°, preferably 3°, relative to the horizontal is formed between the chain segment shoulder 28 and the chain segment base 27, with the chain segment neck 29 as the foot point. Within the chain segment head 25 there is a through-opening 251 which, together with the through-openings 251 of the other chain segments, forms the bore 19 for receiving the fixing element 20 (not shown).

LIST OF REFERENCE SYMBOLS

1 Inclined ejector
2 Cast component
3 Cavity plate
4 Gap in the tool
5 Ejector plate
6 Base plate
61 Through-hole within the base plate 6
7 Feed-through in the foot end area of the cavity plate 3
71 Chamfer in the transition area between bushing 7 and bushing 9
8 Recess in the head-side molded area of the cavity plate 3
81 First wall of the conical recess 8
82 Second wall of the conical recess 8
9 Feed-through within the cavity plate 3
91 Guide within the cavity plate 3
10 Hole in the ejector plate 5
11 base piece with mounting part
12 Link chain
121 Chain segment
122 Foot section of link chain 12
123 Head section of link chain 12
13 Transition piece
14 First fastener of the transition piece 13
15 Second fastener of the transition piece 13
16 Ejector head
161 Notch in the ejector head 16
17 Hole in ejector head
18 Threaded section in the base area of the link chain 12
19 Hole in the base section 122 and head section 123 of the link chain 12
20 Fixing element
21 Threaded section in the head part of the link chain
22 Threaded section in the base area of the transition piece 13
23 Threaded section in the head area of the transition piece 13
24 Chain segment section (three-part)
25 Chain segment head
251 Through-opening in the chain segment head 25
26 Chain segment body
261 Chain segment head receptacle
27 Chain segment base
271 Rounding in the transition area between chain segment base 27 and chain segment head support 261
28 Chain segment shoulder
29 Chain segment neck
30 Tilt angle β
31 Angle of inclination α
32 Reference axis A
33 Reference axis B
34 Vertical ejection stroke L
35 Lateral ejection offset S

The invention claimed is:

1. A device, in particular an inclined ejector (1), for demolding a cast component (2) with an undercut from a casting mold for a casting process or an injection molding process with an ejector, comprising:

an ejector head (16) with a profile which is complementary to the cast component (2) with the undercut and is mounted in a recess (8) so as to be displaceable between a casting position and an ejection position, an ejector base (5) movable in a translational direction;

a link chain (12), which mechanically connects the ejector head (16) with the ejector base (5) in order to implement a force and movement deflection, wherein the link chain (12) has a plurality of chain segments (121) engaging in one another in a longitudinal direction, which in particular have low backlash with respect to pull and push in the longitudinal direction and permit tilting relative to one another in at least a first transverse direction, wherein the chain segments (121) have a circular cylindrical base body with respect to the longitudinal direction and an axial through-opening (251) in the longitudinal direction, wherein a bendable fixing element (20) is guided through the through-openings (251) of the chain segments (121) in order to hold the chain segment head (25) of one of the chain segments (121) in a corresponding chain segment head receptacle (261) of the at least one further chain segment (121), wherein the bendable fixing element (20) is additionally slidably mounted in the through-openings (251) in order to secure a base part (122) of the link chain (12) and the chain segments (121) and a head part (123) of the link chain (12) against mutual shearing in a second transverse direction.

2. The device according to claim 1, wherein at least one of the chain segments (121) has one or two chain segment heads (25) projecting opposite one another in the longitudinal direction, which engages without play/backlash with a correspondingly complementary chain segment head receptacle (261) of a further one of the chain segments (121), so that tilting of the chain segments (121) in only the first transverse direction is made possible.

3. The device according to claim 2, wherein at least one of the engaging chain segments (121) has at least one chain segment head (25) projecting in the longitudinal direction, which is cylindrical in shape and has an at least partially segment-like, circular-cylindrical lateral surface, wherein a tapered chain segment neck (29) is provided with respect to the longitudinal direction, so that two engaging chain segments (121) are each held together by the engagement of one of the chain segment heads (25) in the corresponding chain segment head receptacle (261) and are pivotable with respect to the first transverse direction.

4. The device according to claim 3, wherein the chain segment neck (29) is received in a chain segment head receptacle (261) with play/backlash in the first transverse direction to allow tilting of the chain segments (121) by a predetermined angle.

5. The device according to claim 2, wherein at least one of the chain segment heads (25) is arranged between two chain segment shoulders (28) extending in the first transverse direction and/or facing one another, wherein the chain segment head receptacle (261), in which the at least one chain segment head (25) is received, is arranged between two chain segment bases (27) extending in the first transverse direction and/or facing one another, the chain segment shoulders (28) and chain segment bases (27) facing one another and enclosing an angle within which tilting of the chain segments (121) by a predetermined angle is possible.

6. The device according to claim 1, wherein at least two of the engaging chain segments (121) are configured to be joined by inserting a chain segment head (25) of one of the chain segments (121) into the chain segment head receptacle (261) of a further chain segment (121) in the second transverse direction, in particular perpendicular to the first transverse direction.

7. The device according to claim 1, wherein the link chain (12) is guided in a feed-through (7, 9) and/or a guide (91) in order to redirect a force and movement acting on the ejector base (5) to the ejector head (16) in the main demolding direction.

* * * * *